United States Patent

[11] 3,565,255

| [72] | Inventor | Sigvard Nordgard |
| | | 41 Becksjudarvagen, Nacka, Sweden |
| [21] | Appl. No. | 814,038 |
| [22] | Filed | Apr. 7, 1969 |
| [45] | Patented | Feb. 23, 1971 |
| [32] | Priority | Apr. 22, 1968 |
| [33] | | Sweden |
| [31] | | 5361/68 |

[54] APPARATUS FOR COMPOSTING WASTE
2 Claims, 6 Drawing Figs.

[52] U.S. Cl. .................................................. 210/220
[51] Int. Cl. .................................................. C02c 1/12
[50] Field of Search .................................. 210/220,
221, 10, 14, 15, 16, 209, 258, 218, 219

[56] References Cited
UNITED STATES PATENTS
623,772  4/1899  Duey ............................. 210/220

| 660,499 | 10/1900 | Fleming .................. | 210/220X |
| 700,033 | 5/1902 | Glatz ...................... | 210/219 |
| 776,227 | 11/1904 | Edson ..................... | 210/218 |
| 2,474,833 | 6/1949 | Eweson ................... | 210/15X |
| 2,684,941 | 7/1954 | Pasveer ................... | 210/209 |

Primary Examiner—J. L. DeCesare
Attorney—Sughrue, Rothwell, Mion, Zinn and Macpeak ABSTRACT: An apparatus for composting waste, especially kitchen waste providing a plurality of conduits disposed internal to a container storing waste, each conduit lying in a horizontal plane, each at a different level. Each of the conduits is provided with an inlet means for selectively permitting the introduction of either air or water into the respective conduit so as to enable concentration of air or water at selected levels within the container to speed the mouldering process. The invention further provides vibrating means connected to each of the conduits for imparting vibratory motion to the conduits for compacting the waste in the container.

APPARATUS FOR COMPOSTING WASTE

This invention relates to an apparatus for composting waste, in particular kitchen waste.

More particularly, this invention relates to an apparatus for composting waste, in particular kitchen waste, within a container, which apparatus almost copies the decomposition continuously occurring in nature of organic material into substance valuable from the viewpoint of soil cultivation, which substance thus to advantage is returned to the soil. Thus, it is one main object of the invention to provide a composting apparatus which permits rapid conduction of the decomposition process while effectively utilizing the container space so that within a small space volume great quantities of waste can be received and converted into valuable products.

Another object of the invention is to provide a composting apparatus which can be manufactured in units having a capacity corresponding to the kitchen waste from a single family residence up to an order of magnitude which is sufficient for larger conglomerates of houses.

According to one main feature of the invention the apparatus is provided with conduits for supply of water and air to the interior of the container at different levels which correspond to regions up to which the container is being filled with new waste and the decomposition of earlier introduced layers of waste in progress. The conduits are preferably disposed at various levels substantially horizontally over the inner area of the container, such as in the form of spirals. The composting container of the invention can to advantage be combined with a settling basin for waste water or sewage so that otherwise required sludge treating systems are eliminated and the garbage removal can be reduced to a minimum quantity.

Further objects and advantages of the invention will become apparent from the following description considered in connection with the accompanying drawing, which forms part of this specification and of which:

Figure 1:
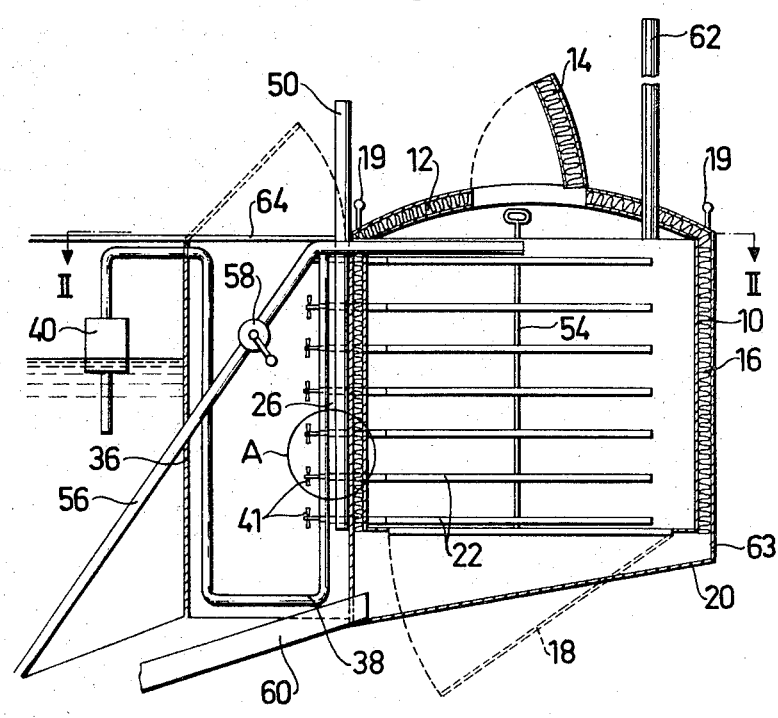
FIG. 1 is a diagrammatic vertical sectional view of a container constructed in accordance with the invention, and a settling basin intended for cooperation with said container.

Referring to the drawing, reference numeral 10 denotes a container which suitably has a cylindrical lateral wall with upright axis and a roof 12 provided with a hinged cover 14. The container is equipped with a relatively strong heat insulating lining 16 on the lateral wall and below the roof. Provided at the bottom of the container is a hinged door 18 to render possible evacuation of the content from the container. This door may be constituted by a net stretched on a frame. The container 10 may be embedded in the ground and it may be adapted to be lifted by means of lifting means to be attached to lugs 19, a space having a sloping bottom 20 being provided below the container.

Figure 2:
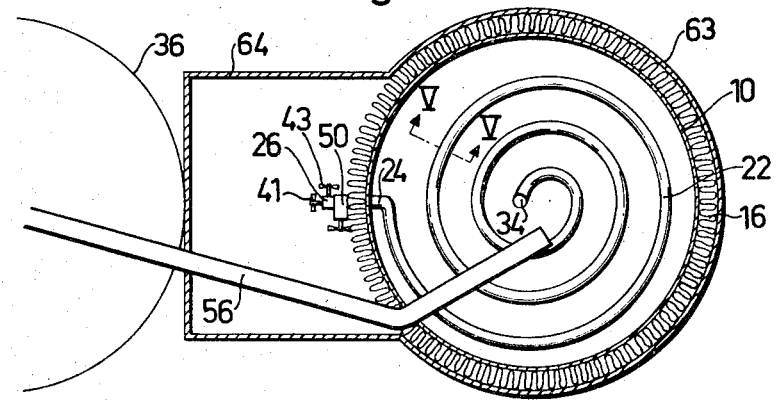
FIG. 2 is a top view following the line II–II of FIG. 1 of the same parts.
Figure 5:
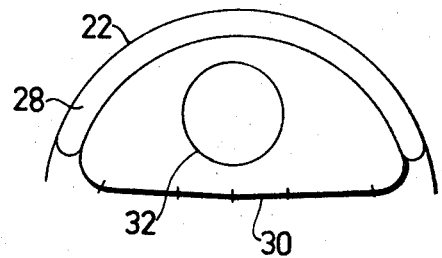
FIG. 5 is a cross-sectional view following line V–V of FIG. 2 in a larger scale.

Provided at different levels in the container 10 are tubular coils 22 which may be bent into spiral form in the horizontal plane as will be seen from FIG. 2 and which constitute conduits which at their outer end 24 through a socket 25 are connected to a vertical manifold or distributing duct 26 for water, said manifold thus being common for the coils located at the different levels. As will be seen from FIG. 5, each coil may be composed of an upper flute 28 forming a cover for a conduit 30 with downwardly facing outlet openings. The coil 22 may also have an inner conduit or coil 32 through which water is known manner is fed to the end portions of the surrounding conduit 30, in the shown embodiment the central end 34 of the conduit. In this way a uniform discharge of water will be ensured in known manner from the bottom side holes of the conduit 30 over the entire length of the coil 22 independent of fluctuations in the water pressure.

Figure 6:
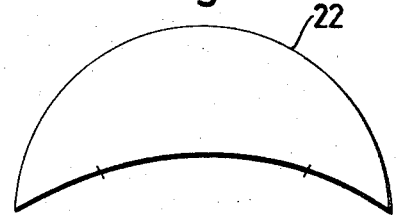
FIG. 6 is the same sectional view as in FIG. 5 but of a modified embodiment of the inner conduits of the container.

The coil 22 may also have the simpler form shown in FIG. 6, both embodiments having in common that the discharge holes are located at the bottom side of the coil, the top side thereof having sufficient strength to absorb the pressure from waste discharged onto and over the individual coils.

Located adjacent the container 10 is a settling or sedimenting basin 36 which preferably receives waste water from the same household that provides waste for the container 10. In this basin sludge is precipitated on the bottom in known manner. The manifold 26 is at its lower end through a duct 38 in connection with the space filled with water of the container 36, the water being pumped by means of a liquid elevator device 40. This device is suitably operative intermittently for a few minutes each time.

Figure 3:
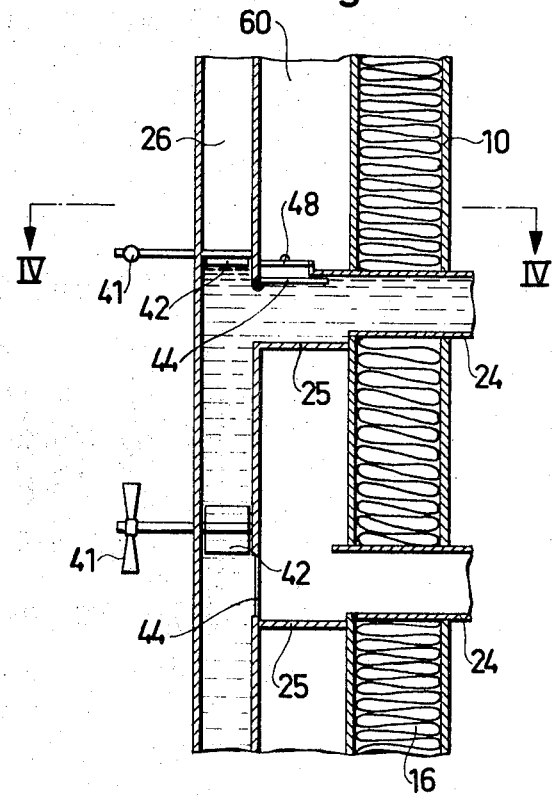
FIG. 3 is a view in a larger scale of the portion indicated in FIG. 1 by the circular line A.
Figure 4:
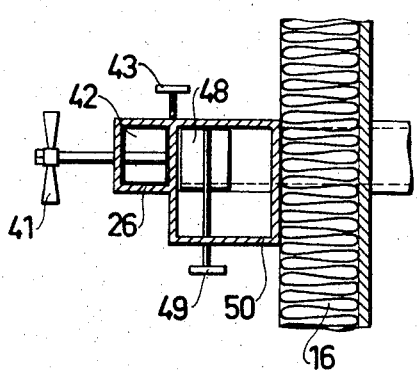
FIG. 4 is a sectional view following line IV–IV of FIG. 3.

Corresponding to each conduit coil 22 is a valve flap 42 (FIG. 3, FIG. 4) in the manifold 26 and actuable by means of a handle 41 so that water can be directed to a desired coil. Provided between each individual coil 22 and the manifold 26 is an additional valve flap 44 which is adjustable to two positions, viz. a first position, in which it opens communication between the manifold and an adjacent coil 22 as is shown in the upper portion of FIG. 3. In its second position the supply of water is interrupted whereas air from a vertical supply and distribution duct 50 is admitted to the coil as is shown in the lower portion of FIG. 3. Then the air is admitted through an opening in the socket 25 which is controlled firstly by the flap 44 and secondly by a slide valve 48 actuable by means of a handle 49. The duct 50 may be connected to a fan or the like (not shown). Depending on the position of the valves 42, 44, 48 either water or air can be supplied to each coil 22. According to FIG. 3, the lower flap 42 is in opening position, the adjacent flap 44 being in closing position. At the same level the communication between the socket 25 and the supply duct 50 for the air is open. The upper valve flap 42 is in closing position for which reason water can not penetrate upwards into the coils located thereabove. Through the flap 44 opened here by the water pressure, water flows into the coil 22 and simultaneously said flap prevents air in the duct 50 from penetrating into the same coil.

By adjusting the various flaps to different positions water or air can be fed to the coils 22 or as shown, water to one of the coils and air to another of the coils. It is easily understood that the air can flow past the socket 25 through which a connection between a coil 22 and the manifold 26 for water has been established.

As mentioned above, the flap 44 is forced by the water pressure into opening position for which reason said flap when said pressure ceases returns by its own weight to the position sealing against the manifold 26. However, said flap may from outside by means of a member 43 be locked in said closing position in order to prevent supply of water to levels where already finally converted compost is existent.

The central end portions 34 of the various coils 22 are interconnected by means of a rod 54 but otherwise arranged in a cantilever manner within the container 10. They may be vibrated by actuation of the rod 54 which is accessible upon opening of the door 14 for the purpose of obtaining a compaction of the content occupying the container. A similar vibration effect can in known manner be brought about by means of a motor with excenter. Sludge from the bottom of the basin 36 is conveyed into the interior of the container 10 through a tube 56 within which a pumping member 58, such as a hand pump, may be provided. The tube 56 opens into the upper portion of the container 10.

The apparatus is operative in the following manner.

Kitchen waste of every kind, including tins and bottles, is fed into the container 10, the individual windings of the coils 22 having such mutual spacing as to allow passage of such matter up to a predetermined magnitude. Greater pieces may be picked out in advance or be removed by hand after having been separated off on the uppermost coil 22 in the container. Initially the waste does not fill more but the lower portion of the container and thus covers one or a pair of the coils 22. By supplying air and with suitable intervals water from the basin 36 through the coils 22 which are in contact with waste, a moldering process is started by decomposition of the organic material contained in the waste. Due to the heat insulation of the container, the temperature within the same raises up to about 60—70° C, for example, which together with the moist atmosphere in a high degree enhances the development within the container of fungi and bacteriae promoting the moldering process. As new material is fed into the container, such material will gradually cover additional coils 22, air or water being fed through the coils which thus now are covered by new waste. In this way the container thus will be filled gradually during a longer period of time with waste and garbage, in which connection due to the disposition of the coils 22 at different levels in the entire container air and water can be directed to those portions of the waste which most urgently require said additions. At uniform intervals sludge from the basin 36 can be supplied through the tube 56 in layers over the waste which further improves the pursued rapid moldering of the waste. By opening the container 10 at its base finally moldered waste can be removed at suitable intervals and separated from containers and bottles of metal or glass or similar material. The products of the decomposition then constitute a valuable addition to the cultivated soil. Nonmolded material only need to be brought to the garbage sump.

Referring now to FIG. 1, reference numeral 60 denotes a discharge conduit for excess of water flowing out from the container. Said container may be in communication with the surrounding atmosphere through a conduit 62. The container may be located within an outer casing 63, which absorbs the earth pressure and which may have a superstructure 64 which renders the adjusting members easily accessible.

The directing of air and water to the different coils may, of course, be effected automatically in response to the state of filling with waste of the container and the progress of the composting process. For example, the various valve flaps 42, 44, 48, respectively, may be actuated by electromagnetic members responding to the requirements in supply of the various additional agents. Also the members 40 and 58, respectively, may be subjected to automatic adjustment. In order to create or maintain in winter also the most favorable conditions for initiation or continuation of the decomposition process, the container may at its base, such as on one or several of the coils 22, for example, be equipped with electric heating coils.

While one more or less specific embodiment of the invention has been shown and described, it is to be understood that this is for purpose of illustration only, and that the invention is not to be limited thereby, but its scope is to be determined by the appended claims.

I claim:
1. An apparatus for composting waste comprising:
   a. a container;
   b. a plurality of perforated conduits located at different levels within said container, each of said conduits being bent in a horizontal plane so as to enable distribution of water and air over said horizontal plane, each of said conduits further comprising an outer end secured to the wall of the container and an inner free end, said inner free end being positioned in the central portion of its horizontal plane;
   c. inlet means, connected to said outer end, for selectively supplying water and air to waste inside said container; and
   d. a substantially vertical elongated vibration bar coupled to each of said conduits at its inner free end for transferring vibrating motions to said conduits.
2. Apparatus as claimed in claim 1 wherein, each of said conduits is spiral-shaped.